US012368928B2

(12) United States Patent
Shen et al.

(10) Patent No.: US 12,368,928 B2
(45) Date of Patent: Jul. 22, 2025

(54) METHODS, APPARATUS AND SYSTEMS FOR CLOUD-BASED VIDEO CONTROL AND MANIPULATION USING FINGER SWIPE INTERFACE

(71) Applicant: TVU Networks Corporation, Cupertino, CA (US)

(72) Inventors: Paul Shen, Woodside, CA (US); Jared Timmins, Calhoun, GA (US); Luc Comeau, Lakewood, CO (US); Robin Wu, Sunnyvale, CA (US)

(73) Assignee: TVU Networks Corporation, Cupertino, CA (US)

( * ) Notice: Subject to any disclaimer, the term of this patent is extended or adjusted under 35 U.S.C. 154(b) by 0 days.

(21) Appl. No.: 18/349,242

(22) Filed: Jul. 10, 2023

(65) Prior Publication Data
US 2024/0129586 A1 Apr. 18, 2024

Related U.S. Application Data

(60) Provisional application No. 63/368,420, filed on Jul. 14, 2022.

(51) Int. Cl.
*H04N 21/472* (2011.01)
*G06F 3/04883* (2022.01)
*H04N 21/431* (2011.01)

(52) U.S. Cl.
CPC ... *H04N 21/47217* (2013.01); *G06F 3/04883* (2013.01); *H04N 21/431* (2013.01)

(58) Field of Classification Search
CPC ........... H04N 21/47217; H04N 21/431; H04N 21/854; H04N 21/21805; H04N 21/472;
(Continued)

(56) References Cited

U.S. PATENT DOCUMENTS 8,773,470 B2   7/2014   Ingrassia, Jr. et al.
9,582,157 B1   2/2017   Chatterjee et al.
(Continued)

OTHER PUBLICATIONS

Nobrega et al.; "A Method and System of Using Circular Gesture Based User Interface for Video Control"; IP.com Prior Art Database Technical Disclosure, Jul. 2018, 3 pages.

*Primary Examiner* — Chenea Davis
(74) *Attorney, Agent, or Firm* — Lipsitz & McAllister, LLC

(57) ABSTRACT

Systems and methods for controlling video functions across multiple video streams are provided. Multiple video streams are recorded at an event via a corresponding multiple of video sources, the multiple video streams being synchronized in time with each other. The multiple video streams are displayed on a display device. One or more of the multiple video streams may be selected via a touch screen of the display device, which are then presented for playback on the display device. Control of video functions of the selected video streams is enabled via finger gestures on the touch screen of the display device. The video functions may comprise video selection, play, pause, fast forward, rewind, zoom, focus, shuttle, scrub, seek, frame advance, and the like. In the event two or more of the multiple video streams are selected, the two or more video streams may be controlled simultaneously and synchronously.

19 Claims, 6 Drawing Sheets

(58) Field of Classification Search
CPC ........ H04N 21/43072; H04N 21/47202; G06F 3/04883; G06F 3/0481; G06F 3/0484; G11B 27/34; G11B 27/102
See application file for complete search history.

(56) References Cited

U.S. PATENT DOCUMENTS

| | | | |
|---|---|---|---|
| 2006/0170760 A1* | 8/2006 | Anderson, Jr. .... | H04N 21/8133 348/E7.071 |
| 2013/0076908 A1* | 3/2013 | Bratton .............. | H04N 21/2668 348/159 |
| 2018/0121079 A1* | 5/2018 | Li ....................... | G06F 3/04883 |
| 2021/0089779 A1 | 3/2021 | Chan et al. | |

* cited by examiner

Example of traditional video playback

VIEWING MODES

METHODS, APPARATUS AND SYSTEMS FOR CLOUD-BASED VIDEO CONTROL AND MANIPULATION USING FINGER SWIPE INTERFACE

This application claims the benefit of U.S. Provisional Application No. 63/368,420 filed on Jul. 14, 2022, which is incorporated herein in its entirety (including Appendix A) and made a part hereof by reference for all purposes.

BACKGROUND OF THE INVENTION

The present invention relates to the field of cloud-based video. More specifically, the present invention relates to a simplified user interface for review, editing, control, and manipulation of cloud-based video.

Prior art video editing processes typically required a dedicated user interface consisting of a cumbersome physical console with various analog scroll wheels and buttons for carrying out various functions for editing, manipulating and reviewing video streams.

It would be advantageous to provide for simplified control of cloud-based video streams. In particular, it would be advantageous to provide apparatus, methods and systems for controlling multiple video streams, including selecting, synchronizing, viewing, rewinding, fast forwarding, zooming in, zooming out, tagging, frame by frame control, generating replay playlist clips, and the like.

It would be advantageous to enable simple finger gestures on a touch screen to carry out such video control functions.

The methods, apparatus and systems of the present invention provide the foregoing and other advantages, including but not limited to:

- Simplified operational workflow enabling replay and review activities to be controlled by a touch control that enables easier and more advance control of video speed, scrubbing, and video synchronization;
- Complete cloud operation with low latency that enables operators to control, configure and execute replay productions with no required specialty physical equipment on site other than a common touch screen enabled device;
- Flexible video ingest with multiple format support that allows the system to take in almost any source and make that source available anywhere for replay operation;
- Frame accurate synchronization of multiple video sources being presented and controlled from a mobile, remote, or desktop device; and
- Ability to utilize data and video from replay system to natively integrate into large production solutions so that video capture only needs to occur once to enable all downstream production workflows.

SUMMARY OF THE INVENTION

The present invention relates to methods and systems for controlling video functions across multiple video streams. In particular, the present invention relates to a user interface for review, editing, control, and manipulation of cloud-based video, and corresponding methods.

In one example embodiment of a method for controlling video functions across multiple video streams in accordance with the present invention, the method may comprise recording at an event multiple video streams via a corresponding multiple of video sources, the multiple video streams being synchronized in time with each other, displaying the multiple video streams on a display device, selecting one or more of the multiple video streams via a touch screen of the display device, presenting the selected one or more video streams for playback on the display device, and enabling control of video functions of each of the selected one or more video streams via one or more finger gestures on the touch screen of the display device. The video functions may comprise one or more of video selection, play, pause, fast forward, rewind, zoom, focus, shuttle, scrub, seek, frame advance, and the like. In the event two or more of the multiple video streams are selected, the two or more video streams may be controlled simultaneously and synchronously.

Each of the video streams may be recorded at a different viewing angle of the event.

The one or more finger gestures may comprise one or more of:

- a single tap of the touch screen enables selection of a video stream during the selecting step;
- a single tap of the touch screen enables toggling between play and pause of the selected videos;
- a single finger swipe to the right enables frame by frame forward scrubbing with forward video playback corresponding to a speed of the swipe;
- a single finger swipe to the left enables frame by frame reverse scrubbing with video playback corresponding to the speed of the swipe;
- a single finger drag upward enables toggling between stepped increments of speed of forward playback;
- a single finger drag downward enables toggling between stepped increments of speed of reverse playback;
- a single finger hold and drag to the right enables fast forward shuttle playback with speed increments corresponding to a length of the drag;
- a single finger hold and drag to the left enables rewind shuttle with rewind speed increments corresponding to a length of the drag;
- a double finger drag to the right enables forward frame advance with advance speed corresponding to a speed of the drag;
- a double finger drag to the left enables reverse frame advance with the advance speed corresponding a speed of the drag;
- a single finger drag to the right during playback enables a seek forward function comprising a forward jump in time; and
- a single finger drag to the left during playback enables a seek backwards function comprising a backward jump in time.

When the one or more video streams comprise the two or more video streams, the method may further comprise displaying the two or more video streams in a tiled mode on the display device, each tile in the tile mode displaying a single video stream. In the tiled mode, the one or more finger gestures comprises one of more of:

- a double finger tap of a selected tile displaying one of the video streams enables entering of a full screen focus mode showing only the video stream of the selected tile;
- a two-finger pinch during the full screen focus mode enables a zoom-out function for the video stream;
- a two-finger spread during the full screen focus mode enables a zoom-in function for the video stream;
- a two-finger sliding motion during the zoom-in and the zoom-out function enables repositioning and refocusing of an area of the video stream being viewed.

The focus mode, the zoom-in function and the zoom-out function may be enabled during video playback or pause.

The multiple video streams may be displayed in multiple tiles on multiple pages. A single finger swipe enables toggling between the multiple pages of tiles.

Fast forward may also be enabled by a clockwise wheel motion on the touch screen. Rewind may also be enabled by a counterclockwise wheel motion on the touch screen.

The display device may comprise one of a smartphone, a tablet computer, a laptop computer, a desktop computer, a dedicated user interface, or other wired or wireless computer device with touch screen capability.

The one or more video sources may comprise one or more of a video camera, a television camera, a smartphone, a tablet computer, a laptop computer, or other electronic device with video capability.

The method may further comprise receiving the multiple video streams at a processing and capture system. The multiple video streams may be communicated from the processing and capture system to the display device. Commands corresponding to the finger gestures are communicated from the display device to the processing and capture system. The processing and capture system carries out the commands on the video streams for delivery to and display on the display device.

The present invention also encompasses apparatus and systems for controlling video functions across multiple video streams. In one example embodiment, the system may comprise multiple video sources for recording a corresponding number of multiple video streams at an event, the multiple video streams being synchronized in time with each other. The system may also comprise a display device for displaying the multiple video streams and a processing and capture system for receiving the multiple video streams from the multiple video sources, delivering the multiple video streams to the display device, and carrying out commands received from the display device. The display device may comprise a touch screen interface for selecting one or more of the multiple video streams for playback. The touch screen interface enables control of video functions of each of the selected one or more video streams via one or more finger gestures on the touch screen of the display device. The commands correspond to the finger gestures. The processing and capture system carries out the commands on the video streams for delivery to and display on the display device. The video functions may comprise one or more of video selection, play, pause, fast forward, rewind, zoom, focus, shuttle, scrub, seek, frame advance, and the like. In the event two or more of the multiple video streams are selected, the two or more video streams are controlled simultaneously and synchronously.

The systems and apparatus of the present invention may also include the various features of the method embodiments discussed above.

BRIEF DESCRIPTION OF THE DRAWINGS

The present invention will hereinafter be described in conjunction with the appended drawing figures, wherein like reference numerals denote like elements, and.

DETAILED DESCRIPTION

The ensuing detailed description provides exemplary embodiments only, and is not intended to limit the scope, applicability, or configuration of the invention. Rather, the ensuing detailed description of the exemplary embodiments will provide those skilled in the art with an enabling description for implementing an embodiment of the invention. It should be understood that various changes may be made in the function and arrangement of elements without departing from the spirit and scope of the invention as set forth in the appended claims.

Figure 1:
FIG. 1 shows an example of prior art video playback.

The present invention is directed to a mechanism for easily navigating, selecting, scrubbing, and reviewing content in a touch-based video replay application. The present invention enables the use of various touch gestures, such as directional swipes on the video screen made with a finger or thumb, for scrolling through video content that are precise to the video frame. For example, elongated vertical gestures may enable quick scrolling through long time periods of video. Horizontal single finger gestures may enable frame by frame scrubbing of content. Double and triple single finger taps may enable customizable multi-second rewind and fast forward of content. Such a finger swipe mechanism enables faster identification of video content, quicker location of replay start times, and robust navigation of multi-camera synchronized video replay with a single finger operation. Note that these touch gestures are native to the operating system of the mobile control device (e.g., Apple and iOS finger swipe to turn a page or scroll etc.). The present invention utilizes these gestures in order to provide a better alternative for controlling video playback than prior art cursor, control buttons and/or menus as shown in FIG. 1.

Figure 2:
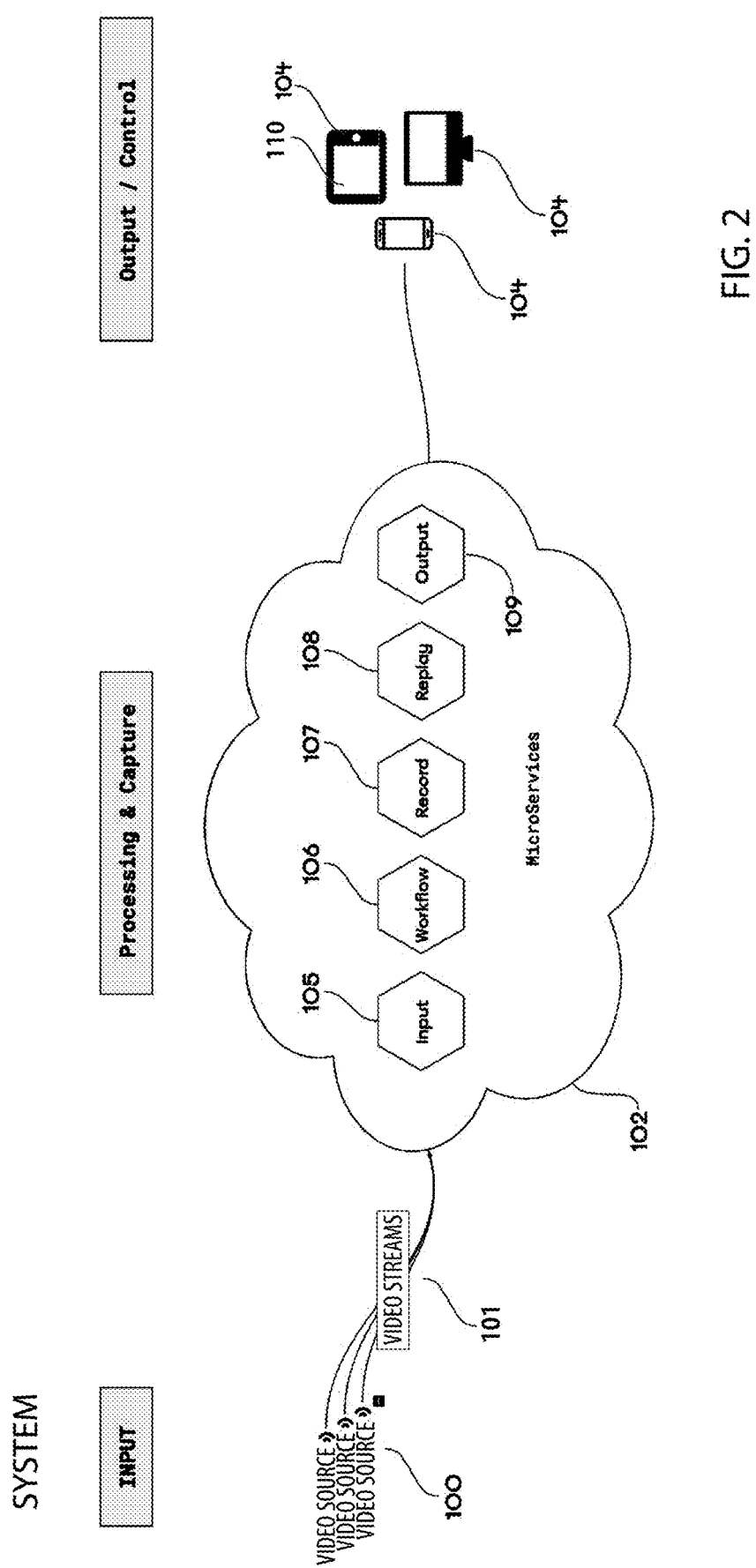
FIG. 2 shows an example embodiment of a system for manipulating video content in accordance with an example embodiment of the present invention.

FIG. 2 shows an example embodiment of a system for controlling video functions across multiple video streams in accordance with the present invention.

The system 102 is comprised of a set of cloud microservices, such as those hosted and operated by TVU Networks as Software as a Service offering. The system comprises already existing TVU Networks patented technologies that constitutes the service side of the present invention. The cloud-based video production applications may include features and functionality as described in commonly owned U.S. Pat. No. 10,966,001 entitled Remote Cloud-Based Video Production System in an Environment Where there is Network Delay and as described in commonly-owned co-pending U.S. Pat. No. 11,463,747 entitled Systems and Methods for Real Time Control of A Remote Video Production With Multiple Streams, each of which is incorporated herein and made a part hereof by reference for all purposes.

Multiple video sources 100 are provided for recording a corresponding number of multiple video streams 101 at an event, the multiple video streams 101 being synchronized in time with each other. A display device 104 is provided for displaying the multiple video streams 101. A processing and capture system 102 is provided for receiving the multiple video streams 101 from the multiple video sources, delivering the multiple video streams 101 to the display device 104, and carrying out commands received from the display device 104. The display device 104 is the end user device and multiple display devices 104 may be provided in accordance with the present invention.

The display device 104 comprises a touch screen interface 110 for selecting one or more of the multiple video streams 101 for playback. The touch screen interface 110 enables control of video functions of each of the selected one or more video streams 101 via one or more finger gestures on the touch screen 110 of the display device. The commands correspond to the finger gestures. The processing and capture system 102 carries out the commands on the video streams 101 for delivery to and display on the display device 104. The video functions comprise one or more of video selection, play, pause, fast forward, rewind, zoom, focus, shuttle, scrub, seek, and frame advance. In the event two or more of the multiple video streams 101 are selected, the two or more video streams are controlled simultaneously and synchronously.

Each video stream 101 may be recorded at a different viewing angle of the event.

The touch screen interface 110 of the display device 104 is offered as either native mobile TVU Networks application running on an iOS or Android device, or served by a TVU Networks Web Service running on a desktop web browser. The Applications running on the control devices 104 include software that present the content (video) served by the processing and capture system 102. Gestures from the display device 104 are interpreted by the software running on the display device 104 and corresponding commands are communicated to the processing and capture system 102, which responds and delivers the request (e.g., a finger slide to right on the touch screen interface 110 while video is paused will request the system to deliver synchronously the next frames of video for the sources being displayed).

The system enables services that allow for the acquisition of multiple video streams 101 for capture into the cloud-based video production application 102, which handles the decoding and synchronization of all inbound video streams 101. The inbound video streams 101 are captured at input module 105. The workflow service module 106 provides management of the various modules 105, 107, 108, 109 to orchestrate, dispatch and output a presentation of chosen video streams 101 by a user from display device 104. Workflow module 106 primarily handles tasks of directing traffic (of inbound video streams 101) to the recording service module 107 and reference actions taken to the Replay service module 108 for output and presentation on display device(s) 104. The Record service module 107 captures inbound video streams 101 and retains/ensures time synchronicity, i.e. ensures that all inbound video streams 101 contain their respective timestamps and that they are all preserved during intake and replay in order to ensure that the user has a multiview of recordings that is perfectly synchronized (e.g. the wide shot of the basketball court and the behind the net source of the same instance in time will synchronously play back together on the display device 104 at the same time as that event occurred).

The display device 104 may comprise one of a smartphone, a tablet computer, a laptop computer, a desktop computer, a dedicated user interface, or other wired or wireless computer device with touch screen capability.

One aspect of the invention is the technologies that ensure this time accuracy, synchronization and presentation to the user of a near-real-time view of an event which just occurred and the ability to review (video playback) and control multiple chosen perspectives (camera angles/sources) simultaneously.

Figure 6:
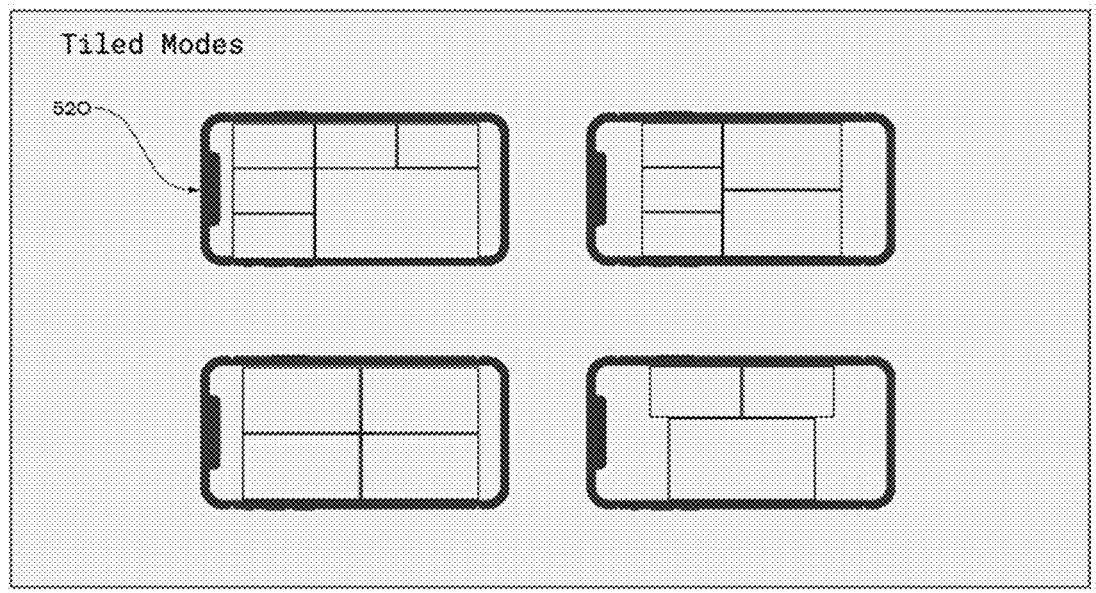
FIG. 6 shows example embodiments of viewing modes in accordance with an example embodiment of the present invention.
Figure 6:
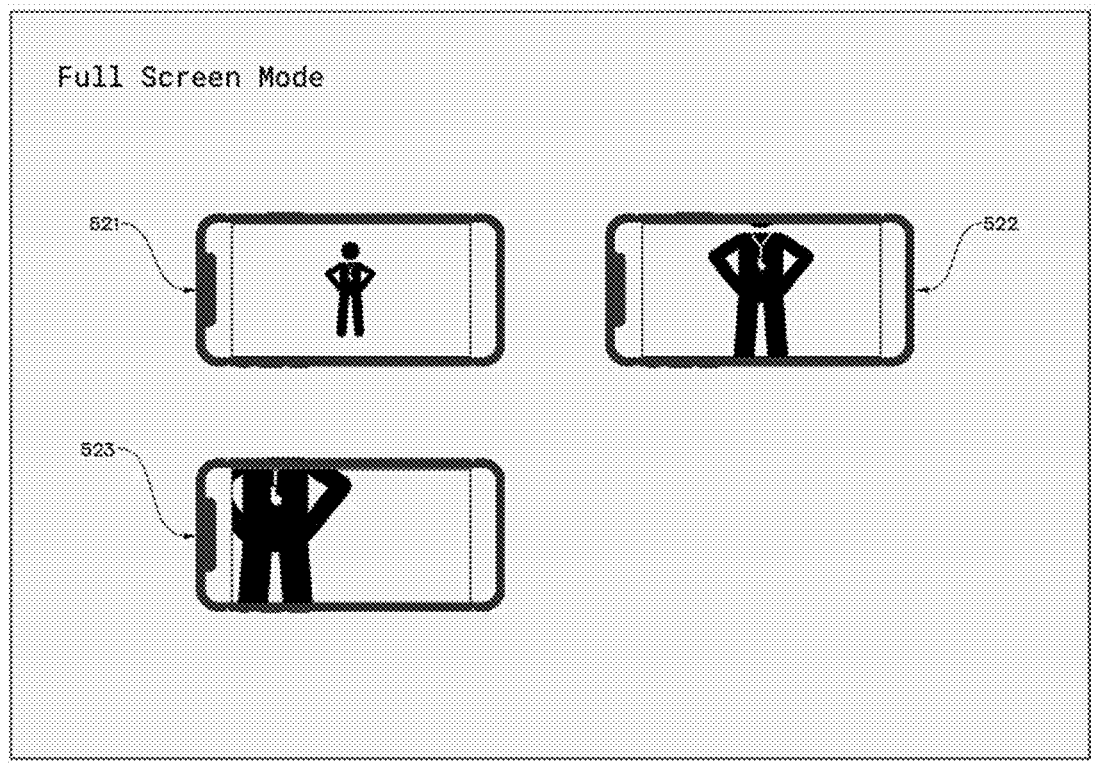

The sources 100 of the video streams may comprise one or more video cameras, television cameras, smartphones, tablet computers, laptop computers, or other devices capable of video encoding and transmission. The video streams 101 are received in the cloud-based processing and capture system 102 which processes the multiple inbound video streams 101, captures (records), and serves up multiple sources concurrently and synchronously to the display device 104, in order to enable carrying out user commands in the form of finger swipe gestures that are input on the touch screen 110 of the user display device(s) 104 in order to control the synchronous playback of multiple sources. The display devices 104 include the touch screen user interface 110 which displays video streams 101 from multiple camera views 100 (sources) of the same event, for example in a grid or tiled 520 format (as shown in FIG. 6) where each camera view may show a different viewing angle of the same event. For example, multiple camera views of a sporting event.

A user can control playback, select and organize sources, and/or focus on a specific point of view (source) for closer (full screen) review on the display device 104, all via various single-finger gestures.

Figure 3:
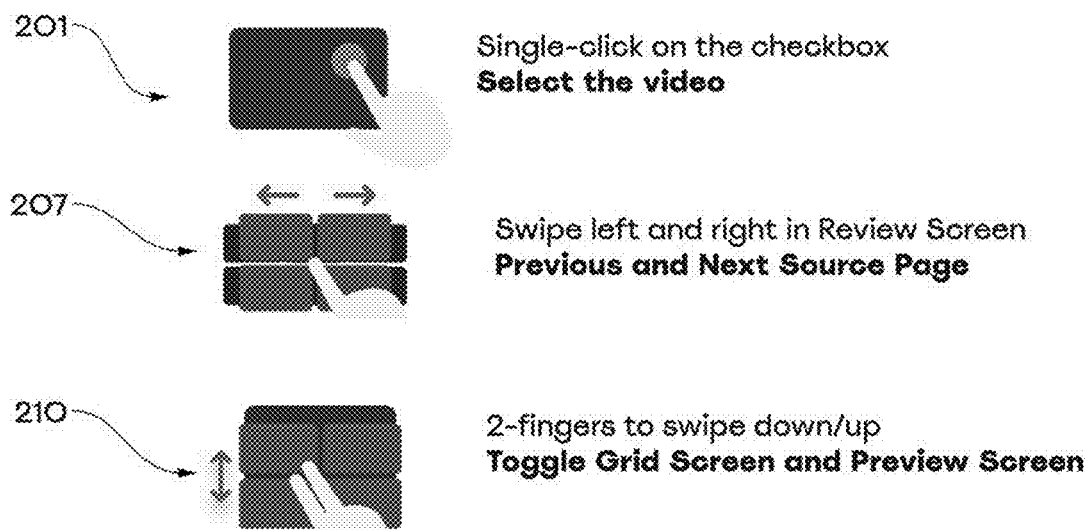
FIG. 3 shows an example embodiment of finger gestures used for selecting video sources in accordance with an example embodiment of the present invention.
Figure 4:
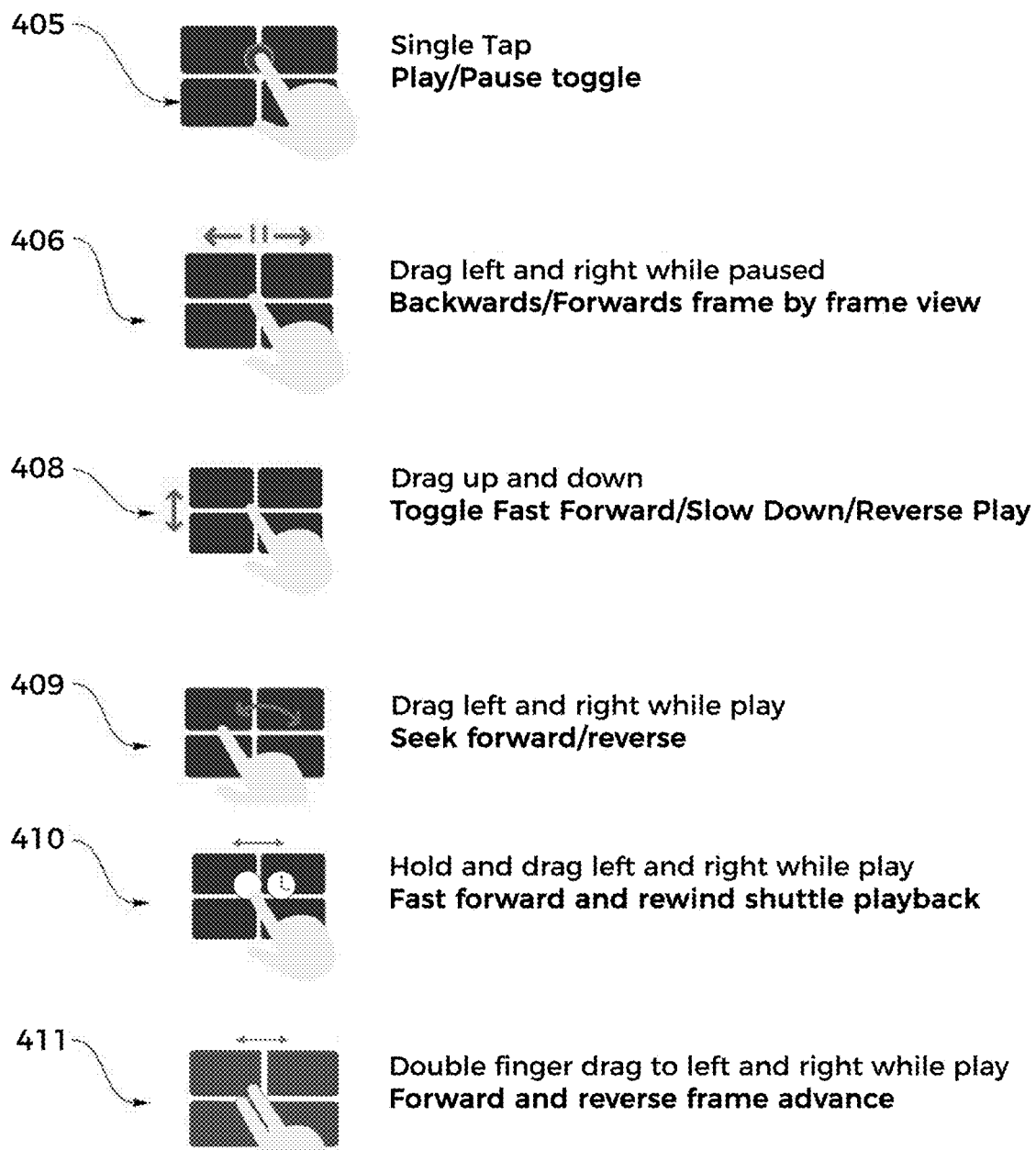
FIG. 4 shows an example embodiment of video playback controls in accordance with an example embodiment of the present invention.

The display of the video content from each view shall be synchronized in time (e.g., using video timestamps), such that on the display device 104, each selected video stream 101 is showing the same moment in time from a different angle. Users may perform 3 main activities on display device 104. As shown in FIGS. 3-6, some example finger gestures for control of the video content may be formatted as follows:

1. As shown in FIG. 3, a user can select which of the multiple video streams 101 to have displayed on the display device 104:
   a. From a tiled presentation of the numerous video streams 101 the user can swipe/browse 207 across the selection of sources and select desired video streams 101 with a single finger tap 201 on the corresponding tile; and
   b. Once selection of the video streams 101 is complete, a two-finger swipe up or down 210 takes the user between the grid screen of selected video streams and a playback viewing mode (as shown in FIG. 6), and the chosen video streams will be presented for playback in a tiled mode 520 layout according to the number of video streams 101 selected;
2. As shown in FIG. 6, control the video playback of the selected video streams 101 in a viewing mode is achieved via various single-finger gestures (as illustrated in FIG. 4):
   a. A single tap 405 of the touch screen 110 toggles between play and pausing the selected videos;
   b. A single-finger drag left/right 406 will navigate video playback frame by frame video scrubbing in forward/reverse, with forward/reverse video playback corresponding to the speed of the swipe;
   c. A single-finger drag upward/downward 408 while in playback will toggle the speed of playback forward/reverse in stepped increments of speed. Upon releasing the finger from the display device 104, playback shall continue at that speed. Alternatively, fast forward/reverse may also be enabled by clockwise/counterclockwise wheel motions on the touch screen;

d. A single-finger drag left/right 409 while in playback will seek forwards/backwards in time—i.e., quick jump to another time position corresponding to a length of the drag;

e. a single finger hold and drag to the right/left 410 enables fast forward/reverse shuttle playback with speed increments corresponding to a length of the drag; and f. a double finger drag to the right/left 411 enables forward/reverse frame advance with advance speed corresponding to a speed of the drag.

Figure 5:
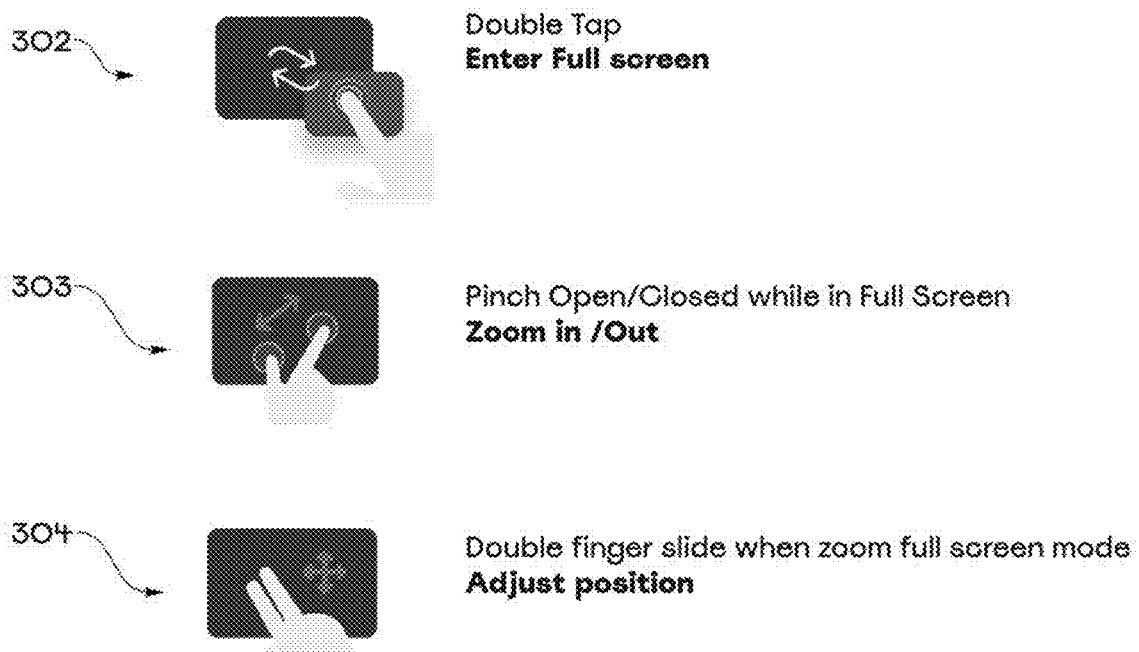
FIG. 5 shows an example embodiment of finger gestures used in focus mode in accordance with an example embodiment of the present invention.

As shown in FIG. 5, focus on a source for closeup review/playback may be achieved as follows:

g. In tiled mode 520, a user can enter a focus mode by a double finger tap 302 on the specific source (tile) to enter a full screen focus mode 521 (FIG. 6).

h. In focus mode, a two-finger pinch/spread 303 enables to zoom-out/zoom-in in the video frame (e.g., zoom view 522);

i. From a zoomed view, a user can reposition/refocusing on an area of the video frame using a double finger sliding motion 304 (e.g., focus view 523);

j. All of the above focus modes are available in both play/pause mode.

Tiles may be repositioned on the display device 104 by touching and holding a finger on the tile and dragging it to a desired position.

Picture-in-picture functionality may be automatically enabled as a default setting on the display device 104.

The finger gestures may be applied anywhere on the touch screen or within a particular tile on the touch screen, depending on the gesture. As shown in FIG. 3, the single tap for selecting a tile may occur on the tile being selected. The navigation between pages and screens shown in FIG. 3 may occur anywhere on the screen. The transport control gestures shown in FIG. 4 may be applied anywhere on the touch screen. The focus control gestures shown in FIG. 5 may be applied within the tile being subject to the control gesture.

Those skilled in the art will appreciate that many variations on the control functions are possible (e.g., the control functions provided by single finger and two finger swipes may be interchanged, and the like).

The present invention is particularly adapted for use on a mobile computer tablet, a laptop, or smartphone. However, the present invention may also be implemented on a desktop computer or dedicated user interface.

Such a system is particularly advantageous for sporting event video replay review by referees, as well as broadcast replay and review by sportscasters working such sporting events.

It should now be appreciated that the present invention provides advantageous methods, apparatus, and systems for single finger manipulation of video content for replay and review purposes.

Although the invention has been described in connection with various illustrated embodiments, numerous modifications and adaptations may be made thereto without departing from the spirit and scope of the invention as set forth in the claims.

What is claimed is:

1. A method for controlling video functions across multiple video streams, comprising:
    recording at an event multiple video streams via a corresponding multiple of video sources, the multiple video streams being synchronized in time with each other;
    displaying the multiple video streams on a display device;
    selecting one or more of the multiple video streams via a touch screen of the display device;
    presenting the selected one or more video streams for playback on the display device; and
    enabling control of video functions of each of the selected one or more video streams via one or more finger gestures on the touch screen of the display device;
    wherein:
    the video functions comprise one or more of video selection, play, pause, fast forward, rewind, zoom, focus, shuttle, scrub, seek, and frame advance;
    in response to two or more of the multiple video streams being selected, the two or more video streams are displayed in corresponding two or more tiles on the display device; and
    a finger gesture inside one of the two or more tiles simultaneously and synchronously controls each of the two or more video streams.

2. The method in accordance with claim 1, wherein each of the video streams is recorded at a different viewing angle of the event.

3. The method in accordance with claim 1, wherein the one or more finger gestures comprise one or more of:
    a single tap of the touch screen enables selection of a video stream during the selecting step;
    a single tap of the touch screen enables toggling between play and pause of the selected videos;
    a single finger swipe to the right enables frame by frame forward scrubbing with forward video playback corresponding to a speed of the swipe;
    a single finger swipe to the left enables frame by frame reverse scrubbing with video playback corresponding to the speed of the swipe;
    a single finger drag upward enables toggling between stepped increments of speed of forward playback;
    a single finger drag downward enables toggling between stepped increments of speed of reverse playback;
    a single finger hold and drag to the right enables fast forward shuttle playback with speed increments corresponding to a length of the drag;
    a single finger hold and drag to the left enables rewind shuttle with rewind speed increments corresponding to a length of the drag;
    a double finger drag to the right enables forward frame advance with advance speed corresponding to a speed of the drag;
    a double finger drag to the left enables reverse frame advance with the advance speed corresponding a speed of the drag;
    a single finger drag to the right during playback enables a seek forward function comprising a forward jump in time; and
    a single finger drag to the left during playback enables a seek backwards function comprising a backward jump in time.

4. The method in accordance with claim 1, wherein the one or more finger gestures comprises one or more of:
    a double finger tap of a selected tile displaying one of the video streams enables entering of a full screen focus mode showing only the video stream of the selected tile;
    a two-finger pinch during the full screen focus mode enables a zoom-out function for the video stream;
    a two-finger spread during the full screen focus mode enables a zoom-in function for the video stream;

a two-finger sliding motion during the zoom-in and the zoom-out function enables repositioning and refocusing of an area of the video stream being viewed.

5. The method in accordance with claim 4, wherein the focus mode, the zoom-in function and the zoom-out function are enabled during video playback or pause.

6. The method in accordance with claim 1, wherein:
the multiple video streams are displayed in multiple tiles on multiple pages;
a single finger swipe enables toggling between the multiple pages of tiles.

7. The method in accordance with claim 1, wherein:
fast forward is enabled by a clockwise wheel motion on the touch screen; and
rewind is enabled by a counterclockwise wheel motion on the touch screen.

8. The method in accordance with claim 1, wherein the display device comprises one of a smartphone, a tablet computer, a laptop computer, a desktop computer, and a dedicated user interface.

9. The method in accordance with claim 1, wherein the one or more video sources comprises one or more of a video camera, a television camera, a smartphone, a tablet computer, and a laptop computer.

10. The method in accordance with claim 1, further comprising:
receiving the multiple video streams at a processing and capture system;
the multiple video streams are communicated from the processing and capture system to the display device;
commands corresponding to the finger gestures are communicated from the display device to the processing and capture system;
the processing and capture system carries out the commands on the video streams for delivery to and display on the display device.

11. A system for controlling video functions across multiple video streams, comprising:
multiple video sources for recording a corresponding number of multiple video streams at an event, the multiple video streams being synchronized in time with each other;
a display device for displaying the multiple video streams;
a processing and capture system for receiving the multiple video streams from the multiple video sources, delivering the multiple video streams to the display device, and carrying out commands received from the display device;
the display device comprising a touch screen interface for selecting one or more of the multiple video streams for playback;
the touch screen interface enabling control of video functions of each of the selected one or more video streams via one or more finger gestures on the touch screen of the display device;
wherein:
the commands correspond to the finger gestures;
the processing and capture system carries out the commands on the video streams for delivery to and display on the display device;
the video functions comprise one or more of video selection, play, pause, fast forward, rewind, zoom, focus, shuttle, scrub, seek, and frame advance; and
in response to two or more of the multiple video streams being selected, the two or more video streams are displayed in corresponding two or more tiles on the display device; and
a finger gesture inside one of the two or more tiles simultaneously and synchronously controls each of the two or more video streams.

12. The system in accordance with claim 11, wherein each of the video streams is recorded at a different viewing angle of the event.

13. The system in accordance with claim 11, wherein the one or more finger gestures comprise one or more of:
a single tap of the touch screen enables selection of a video stream during the selecting step;
a single tap of the touch screen enables toggling between play and pause of the selected videos;
a single finger swipe to the right enables frame by frame forward scrubbing with forward video playback corresponding to a speed of the swipe;
a single finger swipe to the left enables frame by frame reverse scrubbing with video playback corresponding to the speed of the swipe;
a single finger drag upward enables toggling between stepped increments of speed of forward playback;
a single finger drag downward enables toggling between stepped increments of speed of reverse playback;
a single finger hold and drag to the right enables fast forward shuttle playback with speed increments corresponding to a length of the drag;
a single finger hold and drag to the left enables rewind shuttle with rewind speed increments corresponding to a length of the drag;
a double finger drag to the right enables forward frame advance with advance speed corresponding to a speed of the drag;
a double finger drag to the left enables reverse frame advance with the advance speed corresponding a speed of the drag;
a single finger drag to the right during playback enables a seek forward function comprising a forward jump in time; and
a single finger drag to the left during playback enables a seek backwards function comprising a backward jump in time.

14. The system in accordance with claim 11, wherein the one or more finger gestures comprises one or more of:
a double finger tap of a selected tile displaying one of the video streams enables entering of a full screen focus mode showing only the video stream of the selected tile;
a two-finger pinch during the full screen focus mode enables a zoom-out function for the video stream;
a two-finger spread during the full screen focus mode enables a zoom-in function for the video stream;
a two-finger sliding motion during the zoom-in and the zoom-out function enables repositioning and refocusing of an area of the video stream being viewed.

15. The system in accordance with claim 14, wherein the focus mode, the zoom-in function and the zoom-out function are enabled during video playback or pause.

16. The system in accordance with claim 11, wherein:
the multiple video streams are displayed in multiple tiles on multiple pages;
a single finger swipe enables toggling between the multiple pages of tiles.

17. The system in accordance with claim 11, wherein:
fast forward is enabled by a clockwise wheel motion on the touch screen; and
rewind is enabled by a counterclockwise wheel motion on the touch screen.

18. The system in accordance with claim 11, wherein the display device comprises one of a smartphone, a tablet computer, a laptop computer, a desktop computer, and a dedicated user interface.

19. The system in accordance with claim 11, wherein the one or more video sources comprises one or more of a video camera, a television camera, a smartphone, a tablet computer, and a laptop computer.

* * * * *